R. C. LEWIS.
TIME LOCK.
APPLICATION FILED DEC. 22, 1920.
1,386,575.
Patented Aug. 2, 1921.
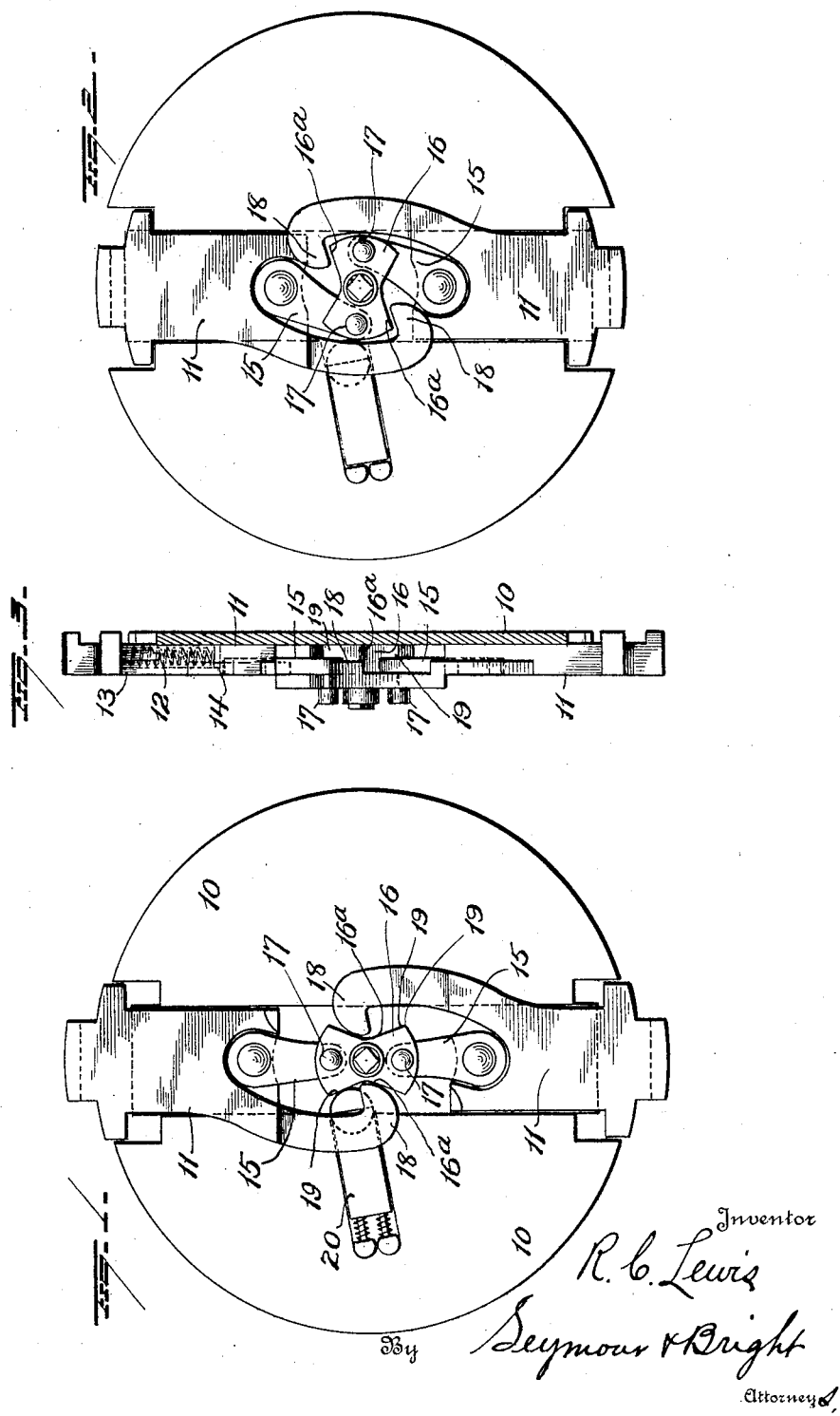

UNITED STATES PATENT OFFICE.

ROLLIN C. LEWIS, OF STAMFORD, CONNECTICUT, ASSIGNOR TO THE YALE & TOWNE MANUFACTURING COMPANY, OF STAMFORD, CONNECTICUT.

TIME-LOCK.

1,386,575.  Specification of Letters Patent.  Patented Aug. 2, 1921.

Application filed December 22, 1920. Serial No. 432,500.

*To all whom it may concern:*

Be it known that I, ROLLIN C. LEWIS, a citizen of the United States, and a resident of Stamford, in the county of Fairfield and State of Connecticut, have invented certain new and useful Improvements in Time-Locks; and I do hereby declare the following to be a full, clear, and exact description of the invention, such as will enable others skilled in the art to which it appertains to make and use the same.

This invention relates to an improvement in time locks and particularly to an improvement on the time lock shown in Patent No. 995,814 granted to W. H. Taylor, June 20th, 1911.

In the Taylor patent the two locking bolts are connected to the actuating links by round pins, the bolts being normally projected by springs and retracted by mechanism of which the links above referred to form a part.

It has been found that after long and constant use, the pins connecting the links with the bolt crystallize and break thus leaving a bolt or bolts projected by its or their springs, thus resulting in a serious lock out as the bolts cannot then be withdrawn or retracted by the time mechanism.

The object of the present invention is to provide safety devices which coact with the device to which the links are connected, so that in the event of the breakage of a connection between the bolts and the bolt retracting means, the safety device will engage the device to which the links are connected and thus retract the bolts.

With this object in view my invention consists in the parts and combination of parts and in the details of construction as will be more fully explained and pointed out in the claims.

In the accompanying drawings; Figure 1 is a view in plan of the plate which carry the time movements and bolts the former being removed, and the bolts being shown projected; Fig. 2 is a similar view showing the bolts in their retracted position, and Fig. 3 is a view in side or edge elevation of the construction shown in Fig. 2, the base or frame plate and one of the bolts being in section.

10 represents the base or frame plate which may if desired be a part of the door, but which is preferably circular in shape and forming a part of the lock. This plate is provided with grooves in which the bolts 11 rest and move and when projected into locking position, as shown in Fig. 1 rest with their ends in a plane beyond the edge of base or frame 10. Each bolt 11 is forced outwardly by a spring 12, shown in Fig. 3 one end of which bears against a shoulder 13 on the bolt and the other end against a stud 14 on the base or frame 11, and each is connected by a link 15 with a centrally located notched disk or double crank 16 by a pin 17. The disk 16 is provided with two oppositely disposed notches 16ᵃ as shown forming in effect a double crank and each bolt is provided at its inner end with an integral hook or projection 18 preferably hook shape, each of which projects past the disk with its hook shaped projection resting within the notch or recess 16ᵃ in the disk 16, so that in the event either link 15 or a pin connecting either link with the bolt should be broken, the shoulders 19 formed by notching the disks would be engaged by the hook shaped ends 18 of the bolts and thus retract the latter. The construction is such that the disk 16 does not normally engage the hook shaped inner ends of the bolts but in the event of breakage or accidental disconnection of the bolts or either of them from the links 15, or the links from the disk, the shoulders 19 would then be in a position to engage the hooks and positively retract the bolts.

20 is a spring pressed block mounted to slide on the base or frame plate 10 with one end in contact with the disk, and adapted to assist the springs 12 in holding the bolts in locking position. This block is spring pressed at one end and bears at its other end against the disk 16 and is so located with relation to the latter as shown in Figs. 1 and 2, that when the bolts are retracted as shown in Fig. 2, it bears against the arc shaped periphery of the disk, and as the latter turns to its bolt locking position, the shoulder 19 of the disk rides under the free end of the block and is held thereby against accidental reverse movement, so that the block 20 assists the springs in holding the bolts in their projected positions.

The double crank or disk 16 corresponds to the wheel or disk 7 of the Taylor patent and this notched disk or double crank is actuated to retract the bolts in the manner and by the mechanism disclosed in the Taylor patent, hence it is not necessary to illustrate or describe this mechanism which constitute no part of the present invention, as my invention relates to the safety device shown and described for preventing a lock out in the event either of the bolts should become disconnected from their actuating disk or double crank.

It is evident that many slight changes might be resorted to in the relative arrangement of parts shown and described without departing from the spirit and scope of my invention hence I would have it understood that I do not wish to confine myself to the exact construction and arrangement of parts shown and described, but, Having fully described my invention what I claim as new and desire to secure by Letters-Patent, is:—

1. In a time lock, the combination of a bolt adapted to be projected by a spring and provided with a hook shaped end, a crank adapted to be actuated by time mechanism and means connecting the crank and bolt for retracting the latter the said hook on the bolt resting in the path of movement of the crank so as to be engaged by the latter in the event of a breakage of the mechanism connecting the crank and bolt.

2. In a time lock, the combination of two oppositely disposed bolts, each adapted to be projected by a spring, each bolt having a projection at its inner end, a double crank adapted to be actuated by time mechanism and means connecting the double cranks and bolts for retracting the latter, the said projections on the bolts resting in the paths of movement of the projections on the cranks so as to be engaged by the latter in the event of a breakage of any of the parts connecting the bolts and double crank.

3. In a time lock, the combination of two oppositely disposed bolts, each of which is provided at its inner end with a projection, a double crank, and means independent of the projections for connecting the double crank and bolts, the projections on the bolts resting in the paths of movement of the cranks so as to be engaged by the latter and positively retract the bolts in the event of a breakage of any of the parts connecting the bolts and double crank.

4. In a time lock, the combination of two oppositely disposed bolts each adapted to be projected by a spring, and each provided with an integral hook shaped inner end, and means independent of the hook shaped ends connecting the two bolts and double crank whereby they move in unison, the hook shaped ends of the bolts resting respectively in the paths of movement of an arm of the crank so as to be engaged by the latter in the event either bolt should become disconnected from the crank.

In testimony whereof, I have signed this specification in the presence of two subscribing witnesses.

ROLLIN C. LEWIS.

Witnesses:
JOHN H. BRAMELL,
CHAS. A. BERRY.